Patented Nov. 9, 1937

2,098,923

UNITED STATES PATENT OFFICE 2,098,923

PROCESS OF PREPARING AMINOACETIC ACID

Edwin T. Mertz, Chicago, Ill., assignor to Armour and Company, Chicago, Ill., a corporation of Illinois No Drawing. Application February 15, 1937, Serial No. 125,929

6 Claims. (Cl. 260—119)

This invention relates to processes of preparing aminoacetic acid, and it comprises processes wherein the yellow connective tissue in animals is subjected to hydrolysis and aminoacetic acid is recovered from the hydrolyzate.

Aminoacetic acid, commonly referred to as glycine, is a substance used to considerable extent in pharmacy. It has certain therapeutic properties and has been recommended for use in the treatment of muscular diseases and also as a weight-increasing tonic.

Various synthetic methods have been developed for the preparation of the substance. For example, chloracetic acid can be reacted with ammonia to give aminoacetic acid. None of these synthetic methods give high yields because many by-products are also formed. Aminoacetic acid is one of the products resulting when complex proteins are broken down, but here again so many other substances are associated in the final product that the concentration of the aminoacetic acid is very small. For example, ordinary glue can be broken down to give aminoacetic acid, but glue contains relatively large quantities of other substances such as proline which are so hydroscopic that it is practically impossible to obtain a dried final product, or one which will remain substantially dry.

Collagen is a precursor of glue and, although glue-forming animal tissues have been and are customarily used for preparing aminoacetic acid the final product is quite unsatisfactory because of its extremely high rate of water adsorption.

I have now set myself to the problem of obtaining aminoacetic acid of better quality and of higher yields, especially for therapeutic uses, and I have discovered ways by means of which I can obtain a final product having 50 percent or more of aminoacetic acid associated with harmless impurities which are not hydroscopic to nearly the degree noted in the past. My process is based upon the discovery that animal tissues which are substantially free of collagen, and which consist mostly of elastin can be made to yield aminoacetic acid in concentrations of at least 50 percent in the final product, and that the impurities associated with the aminoacetic acid are substantially less hydroscopic.

The tissue which I use as a starting material is generally known as the yellow elastic tissue. Such tissue is found extensively in the large ligament at the back of the neck (ligamentum nuchae), in blood vessels, in the lungs and windpipe, as well as in smaller amounts elsewhere. It is to be distinguished from the so-called white connective tissue which occurs extensively in tendons, bone sheaths, skull linings, the serous membranes, the skin or hide, and the muscle sheaths. The white connective tissue consists mainly of collagen fibres, whereas the yellow elastic tissue consists mainly of elastin and is substantially free of collagen. Consequently, I avoid contaminating my product with proline and other hydroscopic proteins which form when collagen-containing tissues are hydrolyzed.

Although my process can start with any kind of yellow connective tissue, or a tissue containing mostly elastin and little or no collagen, I find that one of the most convenient sources of such tissue is the neck ligaments of the cow or other animal slaughtered in a packing house. Consequently, I shall describe a specific example with special reference to the use of such neck ligaments.

I shall now describe my invention in more specific detail. The so-called "neck-band" or neck ligaments of the cow are first collected and freed of any adhering tissue or fat. These ligaments are then charged into an autoclave, together with water and the whole mixture boiled for about four hours. During this boiling step most of the gelatine present goes into solution. After the ligaments are removed any adhering matter or flesh is stripped off and the ligaments are again charged into an autoclave or any other suitable vessel wherein they are heated with sulphuric acid solution. For each 100 pounds of ligaments I add about 10 pounds of water and 30 pounds of concentrated sulphuric acid having the usual specific gravity of 1.84. This mixture of ligaments and acid is then heated at a temperature of about 230° F. for about 24 hours. During the course of the treatment the ligaments dissolve and the proteins therein undergo hydrolysis. The hydrolyzate, this being the name ordinarily given to the reaction product in the autoclave, is then diluted with two volumes of water for each volume of hydrolyzate, an adsorbent carbon such as nuchar or other activated carbon added, and the mixture boiled until substantially all of the color has been adsorbed by the carbon.

The decolorizing agent is then filtered off and the filtrate neutralized with slaked lime. Enough lime is added until the solution is slightly alkaline to litmus paper. The lime is used to remove the sulphuric acid as a precipitate of calcium sulphate which is filtered off. The filtrate from this step is then evaporated to about three-quarters of its original volume at a temperature not above about 40° C. This concentration is conducted under a vacuum of about 28 inches of mercury and during the evaporation any ammonia present, or volatile acids, distil out.

The concentrated solution is then made slightly acid with phosphoric acid solution. Advantageously this solution is of about 20 percent strength and the phosphoric acid is used to remove any excess of calcium. As stated, the solution is made slightly acid with the phosphoric acid in order to precipitate all of the calcium as a phosphate. It is advantageous to chill the acidified solution before filtration in order to insure a complete precipitation of all calcium present.

The slightly acid filtrate is now evaporated in a vacuum pan at low temperature and under a high vacuum, usually about 28 inches of mercury, until crystallization begins. Thereupon the mixture is filtered to free it of a large portion of amino acids higher than aminoacetic. Aminoacetic acid remains in solution at this point.

The filtrate is allowed to cool down and has a syrupy consistency at room temperature. The syrup is then spread in pans and dried under vacuum to a substantially dry powder. This powder contains at least 50 percent of pure aminoacetic acid associated with amounts of alanine, glutamic acid and other acids of this type. If pure aminoacetic acid is desired it can be obtained from the concentrate by careful recrystallization from water, but for therapeutic uses I do not find that it is necessary to use pure aminoacetic acid. Any process which will give a final product containing 50 percent of aminoacetic acid is of economic importance provided the impurities present are harmless and substantially non-hydroscopic.

Although I have specified quantities of materials and temperatures in some detail in the foregoing description, I do not wish to be limited to the precise conditions given. In broadest aspects my invention comprises subjecting yellow connective tissue high in elastin to hydrolysis and the recovery of aminoacetic acid from the hydrolyzate. Sulphuric acid is the customary inorganic acid used in the hydrolysis of proteins generally for the preparation of lower amino acids. This is largely due to the fact that the excess of acid can be readily removed as calcium sulphate, and the calcium in turn can be precipitated as a phosphate. Other acids such as hydrochloric will, however, hydrolyze proteins, but it is somewhat more difficult to remove the excess acid.

It will, of course, be understood that the time and temperature of hydrolysis can vary depending in part upon the strength of the acid used and the kind of yellow tissue starting material. It is to be expected that those skilled in this art will make preliminary experiments when dealing with yellow connective tissue from different sources. The conditions stated above are especially applicable to the neck ligaments of the cow. When the neck ligaments of other animals are used some variations in the optimum conditions are to be expected.

In this specification and claims the term "yellow connective tissue and yellow elastic tissue" are synonymous.

Having thus described my invention, what I claim is:

1. The process of preparing aminoacetic acid which includes subjecting yellow connective tissue consisting essentially of elastin to acid hydrolysis and recovering aminoacetic acid from the hydrolyzate.

2. The process of preparing aminoacetic acid which comprises subjecting the neck ligaments of cattle to acid hydrolysis and recovering aminoacetic acid from the hydrolyzate.

3. The process of preparing aminoacetic acid which comprises subjecting yellow connective tissue to the action of aqueous sulphuric acid solution to form a hydrolyzate containing aminoacetic acid, decolorizing the hydrolyzate, adding lime thereto to neutralize the acidity of the hydrolyzate, separating the precipitate of calcium sulphate, adding a precipitant for any excess lime present, filtering, partially concentrating the filtrate and filtering crystallized higher amino acids present, and then evaporating the filtrate to dryness.

4. The process as in claim 3 wherein the tissue starting material is the neck ligaments of cattle.

5. In the process of preparing aminoacetic acid the step which comprises subjecting yellow connective tissue to the action of aqueous sulphuric acid at a temperature of about 230° F.

6. In the process of preparing aminoacetic acid, the step which comprises subjecting the neck ligaments of cattle to the action of aqueous sulphuric acid at a temperature of about 230° F.

EDWIN T. MERTZ.